United States Patent [19]

Paulson

[11] Patent Number: 4,907,619

[45] Date of Patent: Mar. 13, 1990

[54] FLOW PROPORTIONER APPARATUS

[75] Inventor: Jerome I. Paulson, Lancaster, Pa.

[73] Assignee: Delta Conveying Inc., Audubon, Pa.

[21] Appl. No.: 207,174

[22] Filed: Jun. 15, 1988

[51] Int. Cl.[4] .............................................. F16K 11/02
[52] U.S. Cl. ................................ 137/875; 137/561 A; 251/121
[58] Field of Search ............... 137/561 R, 561 A, 862, 137/872, 875; 251/121

[56]  References Cited

U.S. PATENT DOCUMENTS

| 334,386 | 1/1886 | Hough et al. | 137/875 X |
| 359,918 | 3/1887 | Campbell | 137/875 X |
| 3,545,470 | 12/1970 | Paton | 137/875 X |
| 3,599,711 | 8/1971 | Fowler | 137/875 X |
| 4,284,243 | 8/1981 | Shaner | 137/561 A X |
| 4,593,653 | 6/1986 | Schneider et al. | 137/561 A X |

Primary Examiner—John Fox
Attorney, Agent, or Firm—Russell J. Egan

[57]  ABSTRACT

The subject flow proportioner device has a pivoting target plate opposite an inlet and between a pair of axially aligned exit ports. Product is introduced through a flow shaping inlet and strikes a profiled target on the plate forming a cushion and diverting the subsequent product between the outlets.

16 Claims, 3 Drawing Sheets

FLOW PROPORTIONER APPARATUS

BACKGROUND OF THE INVENTION

1. The Field of the Invention

The present invention relates to a method and apparatus for controlling the proportioned flow of granular, namely non liquid and non gaseous, solid material, which is capable of fluent motion, from a single inlet to between two outlets of like dimensions. In particular, the present invention pertains to a method and apparatus which allows easy control of the proportioning of flowing non gaseous and non liquid materials, which are generally either granular or powder in form, from a single source to between two like outlets while avoiding undue wear of the components.

2. The Prior Art

There has been a need for a reliable means to proportion flowing fluant materials which are neither liquid nor gaseous. Most of the devices theretofore proposed have suffered from the disadvantage of being subject to eroding wear by flowing granular or powder solid material, which have the characteristic of being abrasive. Such material has had the tendency to either jam the flow diverting means making control impossible, or rapidly wearing away control surfaces thereby requiring frequent replacement with the attendent costs of replacement and down time for the repairs. Generally these repairs were difficult to make and expensive.

Another problem of the prior art is the known proportioning devices must be placed in such fashion that the downstream pipelines are carefully balanced in pressure drop in order to obtain an accurate split of the material. As the diverting means was eroded, the flow of the material would become erratic due to the uneven surface created on the deflection means.

One industry which has a need for flow proportioning is the power genenrating industry, specifically for coal fired power generating plants. Coal of a high sulfur content has been used in many areas of the country and has resulted in the undesirable generation of air polutants, specifically sulfuric acid. These problems have been largely overcome by the injection of limestone into the combustor to neutralize the resultant sulfuric acid generated with the exhaust gases. In order to produce an even flow of limestone, it is generally necessary to provide four to eight injection lances for each furnace. Generally the lances have been fed by a single pneumatic conveying system, with flow splitters located periodically to evenly divide the solids among the lances. Such splitters have been provided by several companies, such as the Fuller Company, Dacon Fluid Technology, and Allen-Sherman-Hoff Company.

However, due to the abrasiveness of limestone, having any mechanism located in the flow stream must be avoided if at all possible. Heretofor, most designs incorporated a symmetrical piping configuration on the discharge side to prevent short circuiting of the material in one pipeline or the other.

SUMMARY OF THE INVENTION

The present invention is a flow proportioning means which allows proportioning of a single flow of material into two flows. The proportioning device is contained in a housing defining a proportioning chamber and mounted in a material flow system between a single inlet, or material flow source, and a pair of axially aligned outlets or material consumption devices. A diversion plate is pivotally mounted within the chamber opposite the inlet and between the outlets. The plate has a central profiled impact surface which is concaved to a hemispherical depression. Positioning means fix the lie of the plate so that material striking the plate is diverted to the outlets in the desired ratio.

The subject flow proportioner device incorporates an externally adjustable impact plate having a hemispherical recess forming a target area. The solids being conveyed are passed through a tapered inlet and strike the target area forming a pocket of solids. The focal point of this target area can be changed in order to unbalance the impact point. By redirecting the flow left or right, the solids can be split equally between outlet pipelines that contain unequal pressure drops. The shape of the hemispherical target and the pivoting means will provide both highly sensitive response to the solids and a much broader range of pressure drop differential from either side of the split.

BRIEF DESCRIPTION OF THE DRAWINGS

The present invention will be described, by way of example, with reference to the accompanying drawings in which.

DETAILED DESCRIPTION OF THE PREFERRED EMBODIMENT

Figure 1:
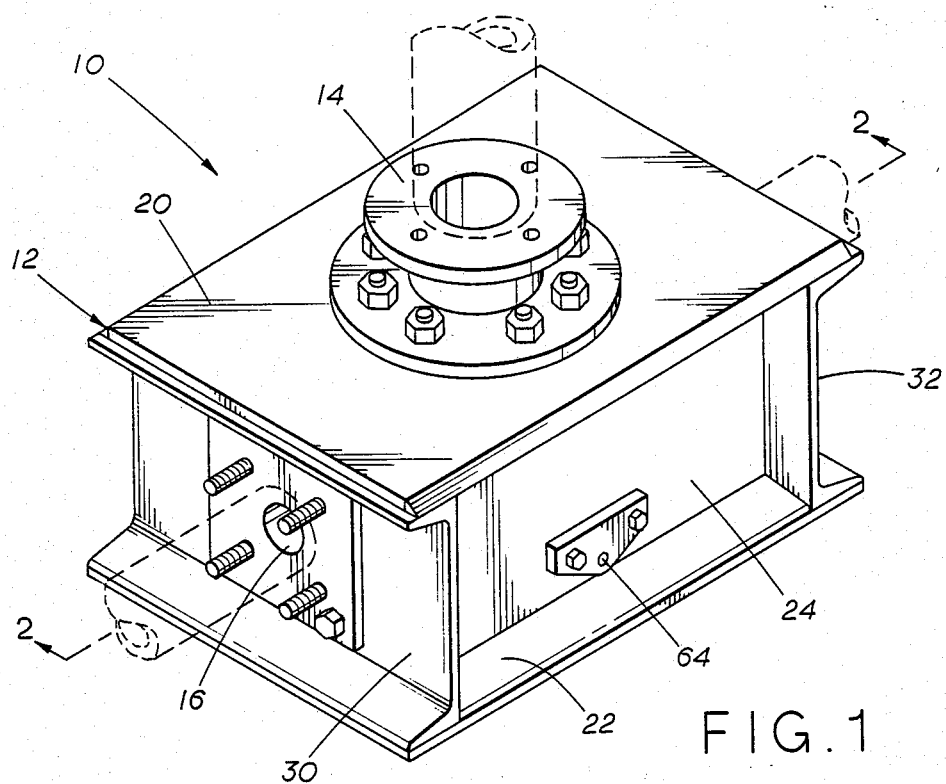
FIG. 1 is a perspective view of a flow proportioning device according to the present invention.
Figure 2:
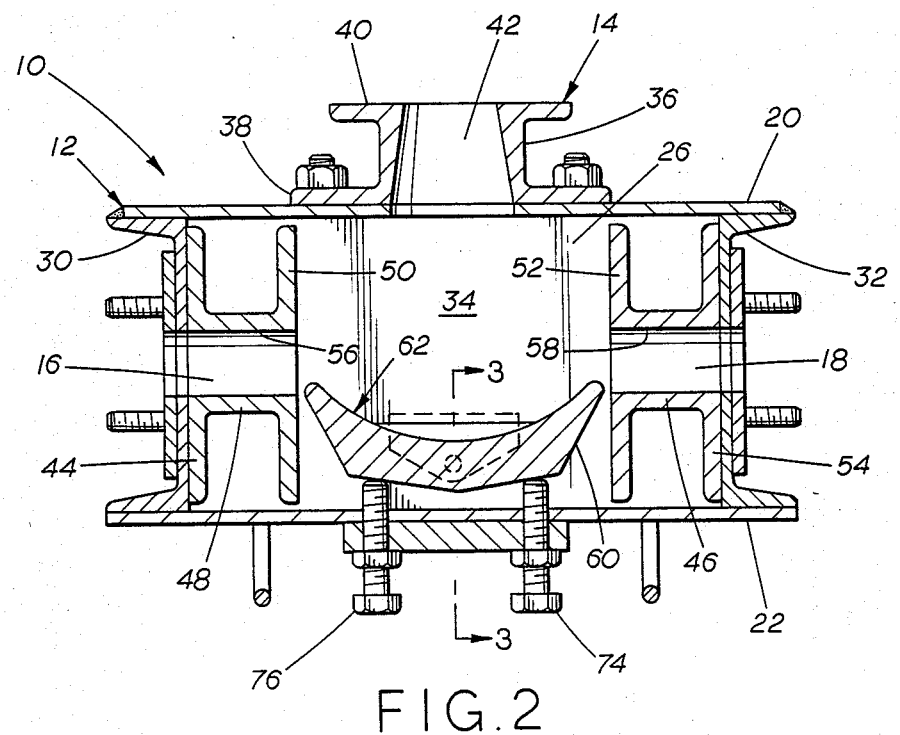
FIG. 2 is a transverse section taken along line 2—2 of FIG. 1.
Figure 3:
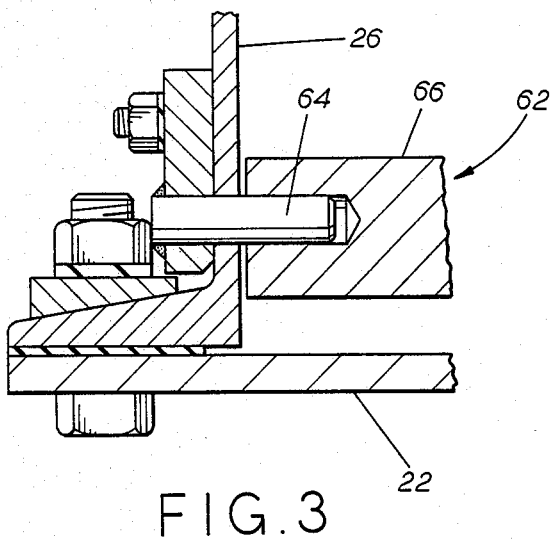
FIG. 3 is a detailed section taken along line 3—3 of FIG. 2.
Figure 4:
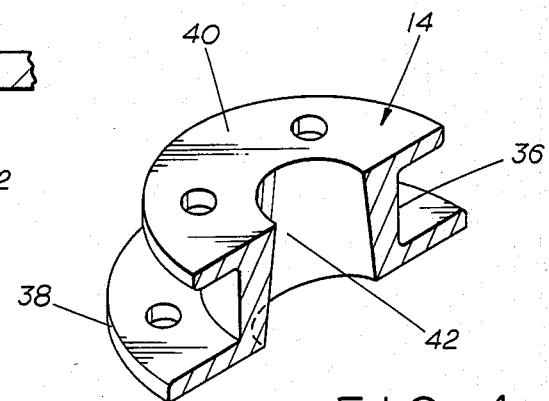
FIG. 4 is a perspective section through the inlet coupling of the present invention.
Figure 5:
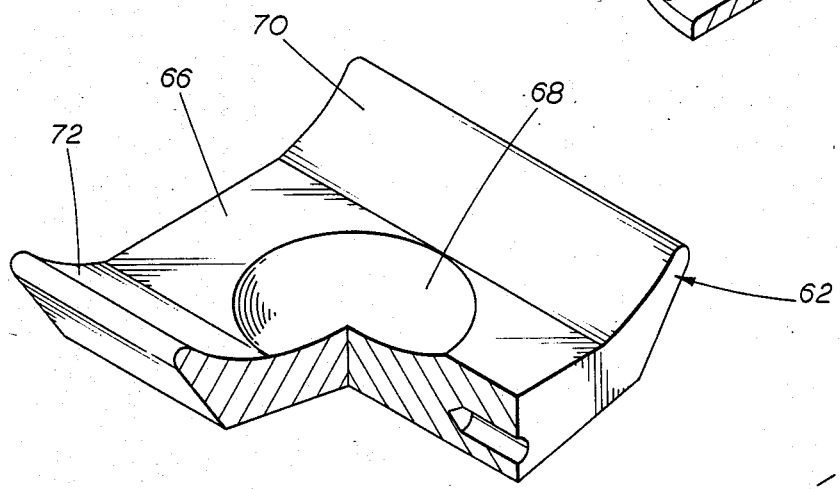
FIG. 5 is a perspective view, partially in section, of the flow proportioning plate of the present invention.

The subject flow proportioning apparatus is intended for use in pneumatic conveying systems, both in dense and dilute phases, where the flow of solids must be distributed from a single line into two pipelines. Consecutive proportioning devices are used to permit further division of the flow into as many subsidiary lines as is required.

The subject flow proportioning device 10 comprises a housing 12 having an inlet 14 and a pair of axially aligned outlets 16, 18 extending normal to and on opposite sides of the inlet 14. The housing 12 is formed by a top member 20, a bottom member 22, spaced side walls 24,26 and end walls 28,30. The end walls 28,30 are shown with an outwardly directed channel shape to accommodate assembly with the top and bottom members 20,22 by any of the well known means, such as welding or bolts. The side walls 24,26 are likewise fixed between the top and bottom members with the members and walls defining therein a chamber 34.

The inlet 14 has a connection member 36 with mounting flanges 38,40 on the opposite ends thereof and a central passage 42 extending therethrough. The passage 42 is circular at the open upper end and ovate at the lower end adjacent the port 14. Each outlet 16,18 has a port member 44,46 with flanges 48,50 and 52,54 respectively and circular passages 56,58. The members 36,44,46 are bolted or otherwise fixed to the top member 20 and end walls 30,32, respectively.

A proportioning assembly 60 is mounted in the chamber and includes a deflection member 62 mounted on pivot means 64 for rotation about an axis normal to the axis of the outlet ports. The member has an impingement surface 66 which includes a central hemispherical recess 68 and a pair of inclined directing side flanges 70,72 adjacent to and normal to the exit ports 16,18.

At least two adjustment means 74,76 are mounted in the bottom member aligned to engage the deflection member to either side of the pivot point.

Figure 6:
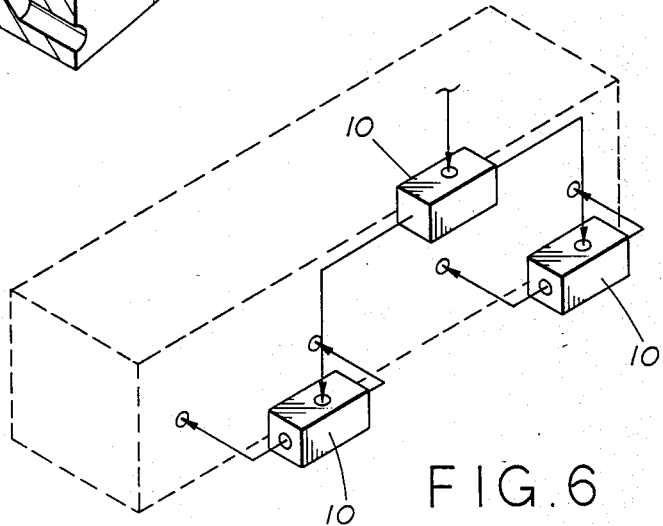
FIG. 6 is a schematic prespective of a system employing three flow proportioning devices according to the present invention.

In operation the subject flow porportioning device is connected between a source of material (not shown) and a pair of material consumers (also not shown). An example of this type of arrangement would be in coal fed power stations where it is desired to maintain a number of furnaces from a single supply. In such cases it may also be expected that a series of the subject devices would be assembled in the fashion schematically shown in FIG. 6. The material, for example limestone would be fed to the inlet by a conventional conduit. The member 42 changes the shape of the flowing material from generally circular to generally elliptical, with the long axis of the elipse extending in the direction of the axes of the outlet ports. The flowing material drops, under the force of gravity, against the diverting member and rebounds in the direction of one of the outlets. By positioning the deflection plate it is possible to cause proportioned amounts of material to be deflected into the two outlets.

The principle employed in the present invention is one of balancing pressure resistance from one discharge pipeline to the other. Without a method of adjustment, the solids will follow the path of least resistance. The result is solids pass down the shortest pipeline. As an example, the pressure within the subject proportioner will be equivalent to that necessary to move the solids from the proportioner to an injection lance in a furnace, or other system discharge point. A short pipeline on one side will produce a shorter, or lower, resistance. The flow of solids would favor this direction until the mass resistance achieves stability with the higher pressure drop or longer side. By adjusting the hemispherical plate, the subject proportioner balances this pressure drop by causing a greater resistance, artifically, on the short or low resistance leg. The subject device provides for mechanical adjustment and wear assistance for a system that can rarely tolerate mechanical devices in the product stream. The use of a hemispherical implate permits a slight build up of solids protecting the plate and its shape allows for flow adjustment.

Figure 7:
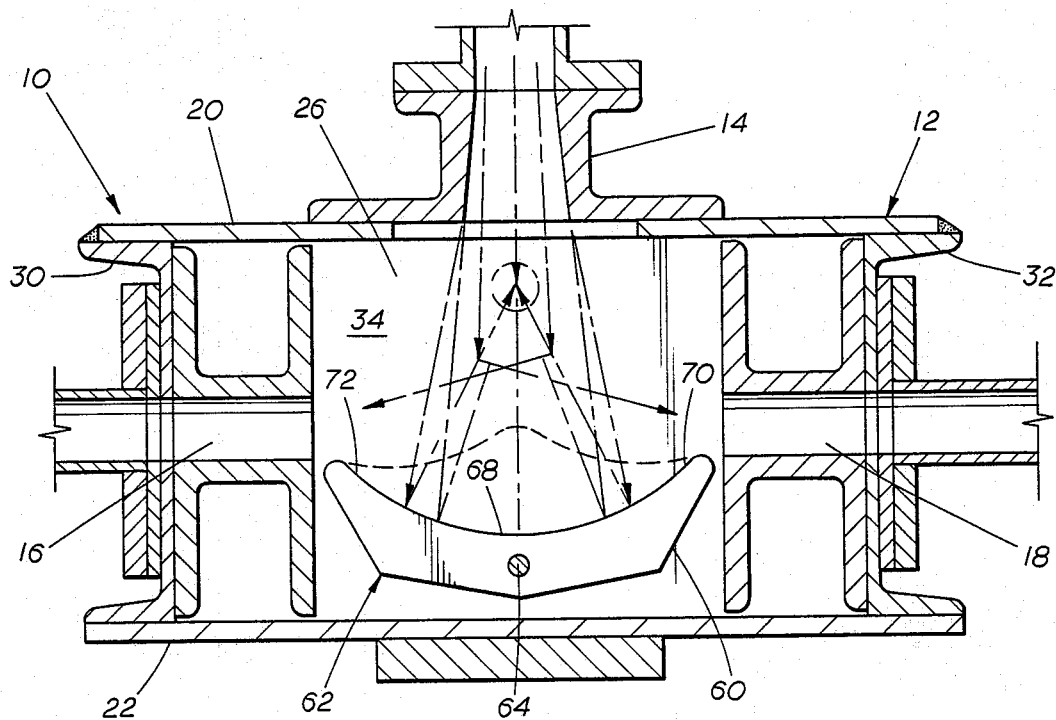
FIG. 7 is a transverse section, similar to FIG. 2, showing the present invention set for even distribution of the flowing material.
Figure 8:
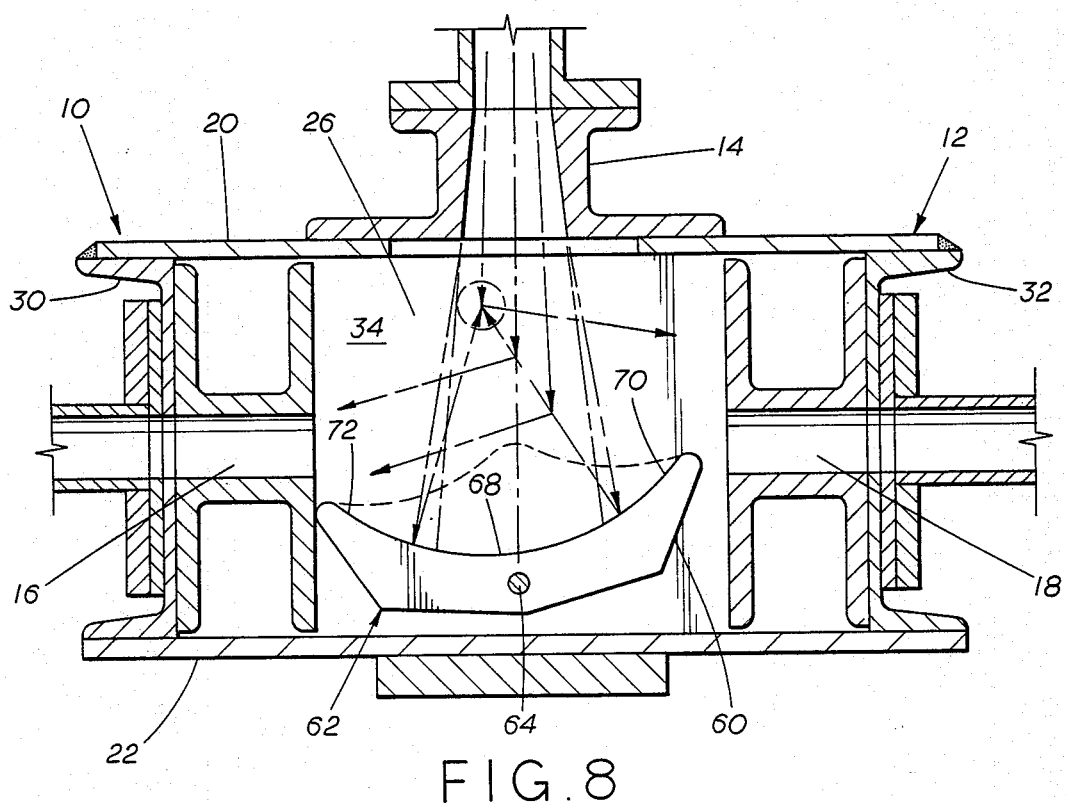
FIG. 8 is a transverse section, similar to FIGS. 2 and 7, showing the present invention set for an unequal distribution of the flowing material to between the two outlets.

The operation of the present invention can be best understood from a comparison of FIGS. 7 and 8. These drawings show the geometric relationship of the shape of the present invention with the particles passing through the chamber. A single force is employed which provides the balancing effect of proportioning flow from one outlet to another. This force is the same as one observes at a baseball game when the batter strikes the ball. All objects are in motion and on a collision course. More appropriately, the situation may more closely resemble billards in that single ball may influence many others. By applying "resolution of forces", particles entering the subject flow proportioner device impact the hemispherical shaped surface with a resultant angle of rebound from the surface. From the graphic illustration of FIGS. 7 and 8 it will be noted that a particle striking the surface and rebounding will strike an incoming particle with the resultant direction both particles being toward the two outlets. This particle impact is focused by the inclination of the hemispherical surface in either direction towards the two outlets. Thus a controlled split of solids can be made by externally adjusted mechanical means changing the relative positioning od the impact plate..

The subject flow proportioning device is preferably made from very hard materials which will be extremely resistant to abrasion. A suitable material would be "ni-hard" of 550 BHN.

The subject flow proportioner device utilizes impact turbulance coupled with spherical focusing to balance the incoming flow into two outgoing directions. The hemispherically shaped impact surface of the present invention is protected to a degree by the solids in the formed focusing pocket, which is a constantly moving and repluntisahing mass. Thus the difficulty of erosion found in the prior art devices, even those made of the hardest steel, is largely avoided. In particular, the disproportionate flow resulting from unevenness caused by erosion of the impact surface is avoided.

The present invention may be embodied in other forms without departing from the spirit or essential characteristics of the present invention. The described embodiment is therefor to be considered in all respects as illustrative and not restrictive of the scope of the present invention.

What is claimed is:

1. A flow proportioning device for proportioning the flow of fluent solids from an inlet to between two outlets, said device comprising:

a generally square housing defining a central chamber having an inlet in a top wall and a pair of axially aligned outlets in two opposite side walls, said outlet openings being symmetric with respect to said inlet opening;

deflection means mounted on a bottom wall of said chamber opposite said inlet and between said outlets, said deflection means being pivotally mounted for rotary movement about an axis transverse to the axis of alignment of said outlets and forming a target surface, said deflection means comprising a deflection member having an upper striking surface with a substantially central hemispherical recess flanked by a pair of diverging flanges extending generally parallel to each other and transverse to the axis of alignment of said outlet ports, said flanges lying closely adjacent respective outlet ports; and means to adjustably position said deflection means whereby material falling from said inlet and striking said deflection member will be rebounded and proportionally deflected toward said outlets.

2. A flow proportioning device according to claim 1 wherein said housing comprises:

a top member having an inlet opening therein;

a solid base member parallel to and spaced from said top member;

a pair of end walls parallel to and spaced from each other and fixed between said top and bottom members, each said end wall having an outlet port therein; and a pair of said walls parallel to and spaced from each other and fixed to said top and bottom members and to said end walls, said members and walls together defining said central chamber.

3. A flow proportioning device according to claim 2 wherein said chamber is substantially cubic in shape.

4. A flow proportioning device according to claim 1 wherein at least said deflection means is formed from metal having a hardness of 550 BHN.

5. A flow proportioning device according to claim 1 further comprising:

an inlet member having a pair of spaced mounting flanges on opposite ends of a conduit, said conduit having a circular profile at a first end and tapering to an ovate profile at the opposite end adjacent said inlet opening, whereby material passing therethrough will be reformed from a generally circular pattern to an ovate pattern the longer axis of which will lie in the direction of the axial alignment of said outlet ports.

6. A flow proportioning device according to claim 1 wherein said means to adjustably position said defection means comprises:

at least two members equally spaced on opposite sides of the pivotal axis of said deflection means and actuatable from the exterior of said housing whereby the angular poritioning of said deflection means is adjusted.

7. A flow proportioning device according to claim 7 wherein said two members comprise:

threaded shafts extending through a base of said housing to engage said deflection means on opposite sides of its pivotal axis.

8. A flow proportioning device for splitting the flow of fluant solid material coming from a single inlet to between two outlets of equal size, said device comprising:

housing means defining a chamber having two outlet openings in axial alignment on two opposite sides of said chamber and an inlet opening on a third side of said chamber located between said sides having said outlet openings;

flow diverting means mounted on a fourth side of said chamber opposite said inlet opening and between said outlet openings;

means mounting said flow diverting means for rotary movement about an axis lying transverse to and spaced below the alignment axis of said outlet openings; and said flow diverting means having an impact surface formed with a substantially central hemispherical depression therein whereby said flowing solid materials strike said impact surface and rebound to form a moving mass to material upon which subsequently arriving material will strike and rebound in either of two directions generally toward said outlet openings.

9. A flow proportioning device according to claim 8, wherein said flow diverting means is a generally rectangular plate one side of which forms said impact surface.

10. A flow proportioning device according to claim 8 further comprising:

a pair of flanges intergral with opposite sides of said flow diverting plate, said flanges lying parallel to each other and on the sides of said plate adjacent said outlet openings, whereby material striking said plate will be more easily directed toward said outlet openings.

11. A flow proportioning device according to claim 8 further comprising:

means forming said inlet opening into an ovate shape the longer axis of which lies in the direction of said outlet openings whereby inflowing material will be initially shaped to an oval form allowing it to be more readily rebounded towards said outlet openings.

12. A flow proportioning device according to claim 8 wherein at least said plate of said device is formed from material having a hardness of 550BHN.

13. A flow proportioning device according to claim 8 further comprising means for rotatably positioning said flow diverting means to angular positions with respect to said outlets whereby the flow is proportioned between said outlets.

14. A flow proportioning device according to claim 13 wherein said means for rotatably positioning said flow diverting means comprises at least two threaded members extending into said chamber beneath said flow diverting means and operable from the outside of said housing means.

15. A method for splitting the flow of fluant solid material coming from a single inlet to two like outlets comprising the steps of:

providing a substantially closed chamber having two outlet openings axially aligned on opposite sides of said chamber and an inlet opening on a third side of said chamber between said outlet openings;

providing deflections means in said chamber on a fourth side opposite said inlet opening and between said outlet openings, said deflecting means being mounted for pivotal movement about an axis transverse to an spaced below the axis of alignment of said outlet openings;

providing said deflecting means with an impact surface having a hemispherical depression aligned with said inlet opening;

flowing fluant solid material through said inlet opening into said chamber to strike against and rebound from said impact surface toward said outlet openings.

16. The method according to claim 15 further comprising:

providing means for adjustably portions the angular setting of said deflection means whereby said fluant solid material will be proportionately directed towards said outlet openings.

* * * * *